United States Patent [19]
Green

[11] 4,043,531
[45] Aug. 23, 1977

[54] FISHING POLE HOLDER
[75] Inventor: Harvey L. Green, Scottsbluff, Nebr.
[73] Assignee: The Raymond Lee Organization, Inc., New York, N.Y. ; a part interest
[21] Appl. No.: 665,068
[22] Filed: Mar. 8, 1976
[51] Int. Cl.² .............. A01K 97/10; A47G 25/12
[52] U.S. Cl. .................. 248/537; 248/206 R; 248/538
[58] Field of Search ............. 248/518, 520, 521, 538, 248/537, 514, 515, 206 R, 467

[56] References Cited
U.S. PATENT DOCUMENTS

| 835,821 | 11/1906 | Fellows et al. | 248/538 |
|---|---|---|---|
| 1,876,478 | 9/1932 | Duzer | 248/518 |
| 2,580,130 | 12/1951 | Rowdon | 248/514 X |
| 2,628,795 | 2/1953 | Diderrich | 248/538 X |
| 2,965,345 | 12/1960 | Gundelfinger et al. | 248/206 R |
| 3,020,014 | 2/1962 | Emery | 248/514 |
| 3,750,991 | 8/1973 | Ragir | 248/206 R |

Primary Examiner—J. Franklin Foss
Attorney, Agent, or Firm—Howard I. Podell

[57] ABSTRACT

A holder unit for fastening a fishing pole to a flat surface, such as on a boat. The unit is in the form of a pair of wire loops fastenable about a fishing pole mounted on a base to which an expandable suction cup is fixed. A pivotable lever, that extends beyond the base, serves to expand the volume of the internal recess of the suction cup so as to create a clamping suction, when desired.

2 Claims, 3 Drawing Figures

FISHING POLE HOLDER

SUMMARY OF THE INVENTION

My invention is a holder unit for fastening a fishing pole to a flat surface, such as on a boat. The unit is in the form of a pair of wire loops fastenable about a fishing pole mounted on a base to which an expandable suction cup is fixed. A pivotable lever, that extends beyond the base, serves to expand the volume of the internal recess of the suction cup so as to create a clamping suction, when desired.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
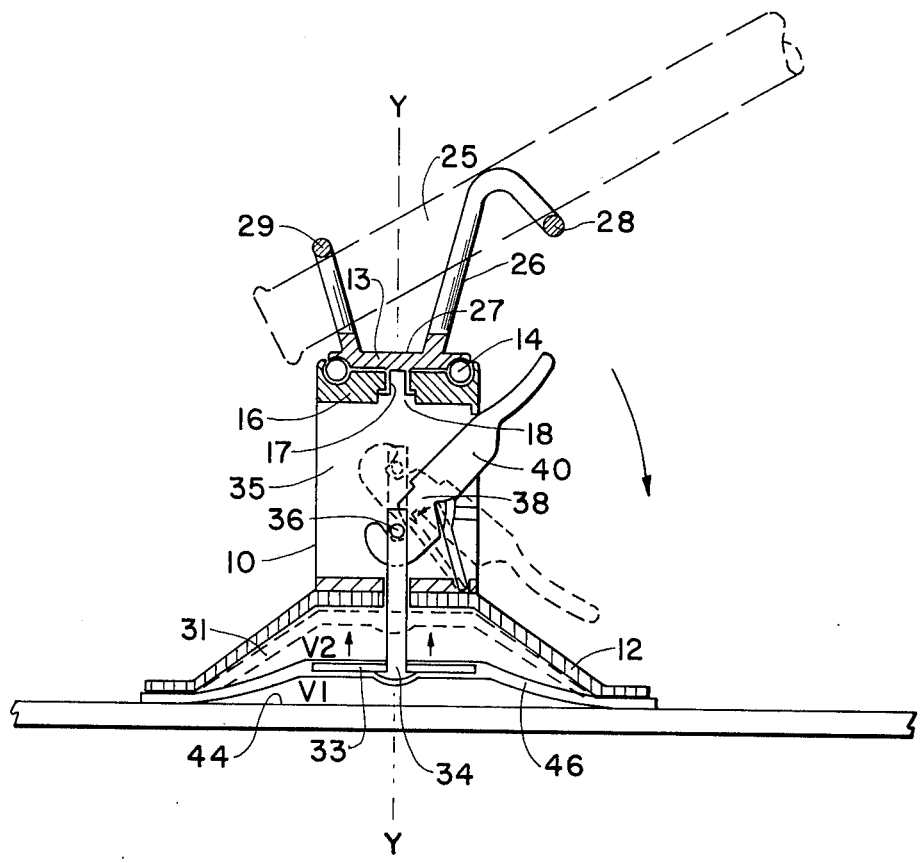
FIG. 1 is a sectional view of the invention.
Figure 3:
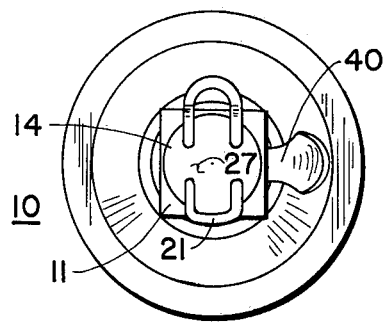
FIG. 3 is a plan view of the invention.
Figure 2:
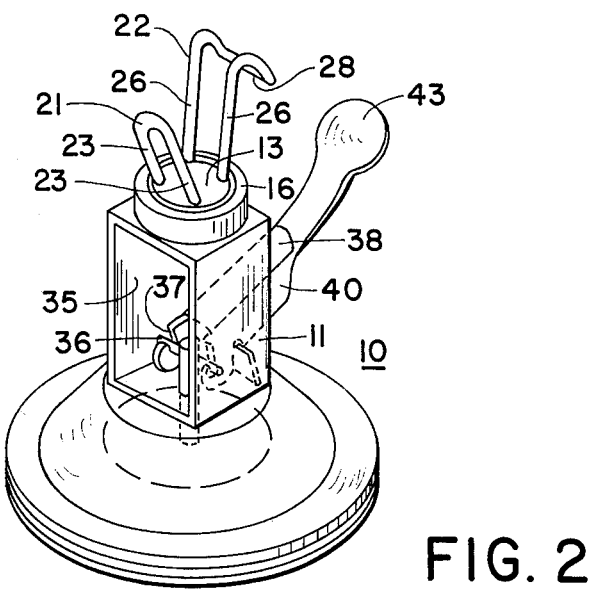
FIG. 2 is a perspective view of the invention.

Turning now descriptively to the drawings, in which similar reference characters denote similar elements throughout the several views, FIGS. 1–3 illustrate the holder unit 10, which is formed of a hollow base section 11, the bottom of which is joined to a semi-flexible cup 12, and with a grip unit 13 fixed to a wire ring 14, rotatably mounted in an undercut circular groove 15 below the surface of the flat top section 16 of the base. Grip unit 13 may be also pivotably mounted by a rivet-shaped 17 projection to a central hole 18 in the top section 16.

Grip unit 13 is fitted with a pair of projecting wire loops 21 and 22 that each extend above the top section 16, in planes angularly offset from each other and from the vertical axis Y—Y of the holder unit 10. A shorter wire loop 21 is in the form of an inverted U-section, with both legs 23 of loop 21 spaced apart from each other by a distance to accommodate the handle 25 of a fishing pole, and fixed to the circular base section 27 of the grip unit. The longer wire loop 22 is similarly formed as an inverted U-member with a pair of parallel spaced legs 26 fixed to the base section 27 and bent along an axis perpendicular to the axes of legs 26 so that the mid-section 28 of loop 22 forms a concave rest upon which a handle 25 may be supported between legs 26, with mid-section 29 of loop 21 and mid-section 28 of loop 22 applying a force couple to hold fishing rod 25 in fixed engagement, but permitting ready removal of handle 25 from loops 21 and 22.

A flexible cup member 31 is fitted inside of semi-flexible cup 12, with cup member 31 formed of a single circular sheet of flexible elastic airtight material that extends from the flange 32 of cup 12 to a concentric washer member 33 embedded in cup member 31 and fixed to an axial pin 34. Axial pin 34 extends along the vertical axis Y—Y of the unit into the interior 35 of the base section 11 and is fixed to a transverse pin 36 that fits within the slots 37 of a pair of parallel jaws members 38 of a lever 40 that extends beyond the base section 11. Lever 40 pivots about a detent 41 fixed to the base section 11 so that rotation of lever, by application of manual pressure to external lever grip 43, serves to draw flexible cup member 31 into cup 12, from the position shown in solid lines to the position shown in dash lines in FIG. 1, thus increasing the volume bounded by a flat surface 44, and the internal surface 46 of cup members 31 from $V_1$ to $V_2$ and creating a gripping suction against surface 44, which may be a fixed surface such as a boat deck or boat gunwale. Lever 41 may be rotated in the contrary direction to release the holder unit 10 from surface 44.

Since obvious changes may be made in the specific embodiment of the invention described herein, such modifications being within the spirit and scope of the invention claimed, it is indicated that all matter contained herein is intended as illustrative and not as limiting in scope.

Having this described the invention, what I claim as new and desire to secure by Letters Patent of the United States is:

1. A holder unit fitted with loop means for attachment to a fishing pole and with suction means for attachment to a flat surface, in which the suction means comprise an expandable flexible cup linked through its center by a pin to a pivotable lever, and in which the loop means comprise a pair of wire loops each shaped as a U-member, with both loops mounted to a base, wherein the flexible suction cup is mounted within a semi-flexible cup that is fixed to a hollow frame, which frame extends about the pivotable lever, with the base of the loop means pivotally mounted to the said frame at a location in which the center of rotation of the base with relation to the frame is an extension of the axis of the pin of the suction cup, so that the base rotates about an imaginary line extending through the center of the suction cup, and in which each of the wire loops of the base extends in an opposed direction to said center of rotation and the center of the suction cup.

2. The combination as recited in claim 1 in which one face of the hollow frame is open, to provide accessibility to the lever.

* * * * *